(12) United States Patent
Chen et al.

(10) Patent No.: US 8,201,667 B2
(45) Date of Patent: Jun. 19, 2012

(54) BRAKING SYSTEM WITH SINGLE ACTUATION FOR A STROLLER

(75) Inventors: Shun-Min Chen, Taipei (TW); Zhi-Ren Zhong, Taipei (TW); Jian-Qun Li, Taipei (TW)

(73) Assignee: Wonderland Nurserygoods Co., Ltd., Neihu, Taipei (TW)

( * ) Notice: Subject to any disclaimer, the term of this patent is extended or adjusted under 35 U.S.C. 154(b) by 1127 days.

(21) Appl. No.: 11/861,320

(22) Filed: Sep. 26, 2007

(65) Prior Publication Data

US 2008/0185236 A1 Aug. 7, 2008

Related U.S. Application Data

(60) Provisional application No. 60/887,610, filed on Feb. 1, 2007.

(51) Int. Cl.
*B62B 9/08* (2006.01)

(52) U.S. Cl. ............. 188/20; 188/1.12; 188/17; 188/31; 188/69; 188/135; 16/35 R; 16/329; 16/436; 16/445; 280/47.371; 280/642; 280/647; 280/650

(58) Field of Classification Search .................... 188/20, 188/7, 69, 19, 31, 2 D, 2 F, 1.12; 280/650
See application file for complete search history.

(56) References Cited

U.S. PATENT DOCUMENTS

| | | | |
|---|---|---|---|
| 2,634,137 A * | 4/1953 | Welden | 280/649 |
| 2,708,555 A * | 5/1955 | Mayo et al. | 242/384 |
| 4,527,665 A | 7/1985 | Shamie | |
| 4,953,667 A * | 9/1990 | Bigo | 188/31 |
| 5,062,179 A * | 11/1991 | Huang | 16/436 |
| 5,478,102 A | 12/1995 | Haung | |
| 5,788,604 A | 8/1998 | Brown | |
| 5,806,877 A | 9/1998 | Huang | |
| 5,823,564 A | 10/1998 | Kettler | |
| 5,833,261 A | 11/1998 | Brown | |
| 5,845,924 A | 12/1998 | Huang | |
| 6,170,615 B1 | 1/2001 | Cheng | |
| 6,341,672 B1 | 1/2002 | Yang et al. | |
| 6,361,056 B1 | 3/2002 | Chen | |
| 6,375,213 B1 | 4/2002 | Suzuki | |
| 6,408,990 B1 | 6/2002 | Chen | |
| 6,464,242 B2 | 10/2002 | Suzuki | |
| 6,742,791 B2 | 6/2004 | Lan | |
| 6,814,368 B2 | 11/2004 | Cheng | |
| 6,877,760 B2 | 4/2005 | Wang | |
| 7,445,229 B2 | 11/2008 | Dotsey | |
| 7,537,093 B2 * | 5/2009 | Chen | 188/20 |

FOREIGN PATENT DOCUMENTS

| | | |
|---|---|---|
| EP | 0 633 178 A1 | 1/1995 |
| GB | 2297133 A | 7/1996 |
| GB | 2 360 980 A | 10/2001 |

* cited by examiner

*Primary Examiner* — Robert A Siconolfi
*Assistant Examiner* — San Aung
(74) *Attorney, Agent, or Firm* — Winston Hsu; Scott Margo

(57) ABSTRACT

Braking system for a stroller utilizes an actuator to move two brakes close to an axis to unlock the rear wheels of the stroller and away from the axis to lock the rear wheels. Each brake comprises a long arm. The brakes are disposed at the opposite sides of the axis. When the actuator is driven to rotate about the axis, the brakes move around the axis to have axial movement close to or away from the axis.

16 Claims, 21 Drawing Sheets

BRAKING SYSTEM WITH SINGLE ACTUATION FOR A STROLLER

CROSS REFERENCE TO RELATED APPLICATIONS

This application claims the benefit of U.S. Provisional Application No. 60/887,610, which was filed on Feb. 1, 2007 and is incorporated herein by reference.

BACKGROUND OF THE INVENTION

1. Field of the Invention

The present invention relates to a braking system of a baby stroller, and more specifically, to a braking system with single actuation for a baby stroller.

2. Description of the Prior Art

A common stroller implements a braking system on its wheels, generally on the rear wheels to provide the safety function in use. Brakes of the braking system can engage with the teeth formed around the central axis of the wheels to maintain the stroller in a still position. A typical stroller's braking system in the prior art sets up two pedals, each above the braking teeth of the wheel, for being stepped downward and each of the pedal has a protrusion capable of engaging with the braking teeth to lock the wheels of the stroller. If someone wants to unlock the wheels, he has to pull up the two pedals respectively.

This so-called separate braking system, however, requires two separate actions to lock one wheel at one time. Another braking system according to the prior art uses a single-actuation device to lock or unlock the stroller's wheels simultaneously. For example, in the U.S. Pat. No. 6,170,615, one single cam is implemented to push each of the brakes simultaneously toward each of the wheels and lock the wheels, but an additional elastic component must be added in, if the brakes can be moved away from the wheels to unlock the wheels at the same time. Additionally, in both the U.K. patent GB02,297,133A and the U.S. Pat. No. 6,408,990, a complicated multi-linkage mechanism is implemented to accomplish locking or unlocking the stroller's wheels with single actuation.

SUMMARY OF THE INVENTION

The present invention provides a braking system for a stroller having a frame and a pair of wheels respectively rotatably connected to the frame. Each wheel has a plurality of braking teeth. The braking system comprises a pair of braking members and an actuator. The actuator is pivotally connected to the frame and capable of rotating about an axis and the pair of braking members are mounted on the actuator at the opposite sides of the axis and capable of engaging with the braking teeth of the wheels or disengaging from the braking teeth of the wheels when the actuator rotates about the axis.

The present invention also provides braking system for a stroller having a frame and a pair of wheels respectively rotatably connected to the frame. The braking system comprises an actuator, a pair of braking members, and a retaining device. The actuator pivotally connects to the frame and is rotatable relative to the frame between a first position and a second position. Each of the pair of braking members has one end mounted on the actuator and the other end operatively disengages from the correspondent wheel when the actuator is in the first position or engages with the correspondent wheel when the actuator is in the second position. The retaining device is mounted between the actuator and the frame for retaining the actuator in either the first position or the second position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
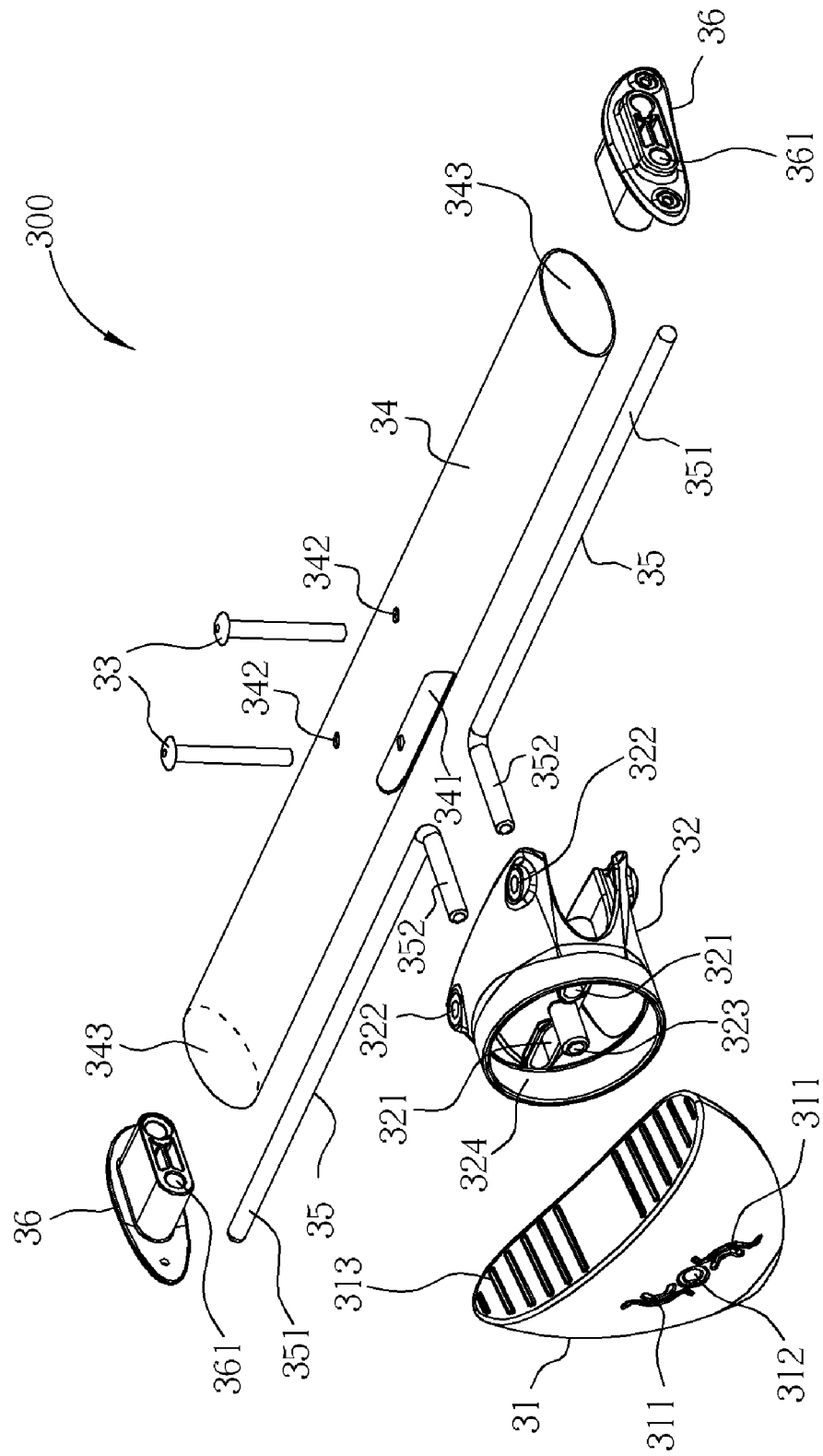
FIG. 1 is an illustration of a first exemplary embodiment of the braking system with single actuation for a stroller according to the present invention.

Please refer to FIG. 1, which is an illustration of a first exemplary embodiment according to the present invention that discloses a braking system 300 with single actuation for a stroller. The braking system 300 comprises an actuator 31, a retainer 32, two rivets 33, a frame 34, two brakes 35, and two sleeves 36. The two brakes 35 are L-shaped rods, each of the brakes 35 has a long arm 351 and a short arm 352, which practically can be implemented to the braking system 300 as stiffening braking wires. The frame 34 is a hollow pipe and has a first channel 341 in the middle section and two side openings 343 at the sides respectively. Generally the frame 34 can incorporate into and as part of the stroller frame and has two sleeves 36 at its two sides to retain the two brakes 35 and a wheel wire that connects to the two wheels. The two brakes 35 are configured inside the frame 34 with one part of the long arms 351 contained inside the frame 34 and the other part extending out of the frame 34 by passing through the side openings 343 respectively. Each of the two sleeves 36 covering on the side openings 343 has a position hole 361 to restrict the long arm 351 of the brake 35 when passing through the side opening 343 and the position hole 361 to move in one direction.

Figure 2:
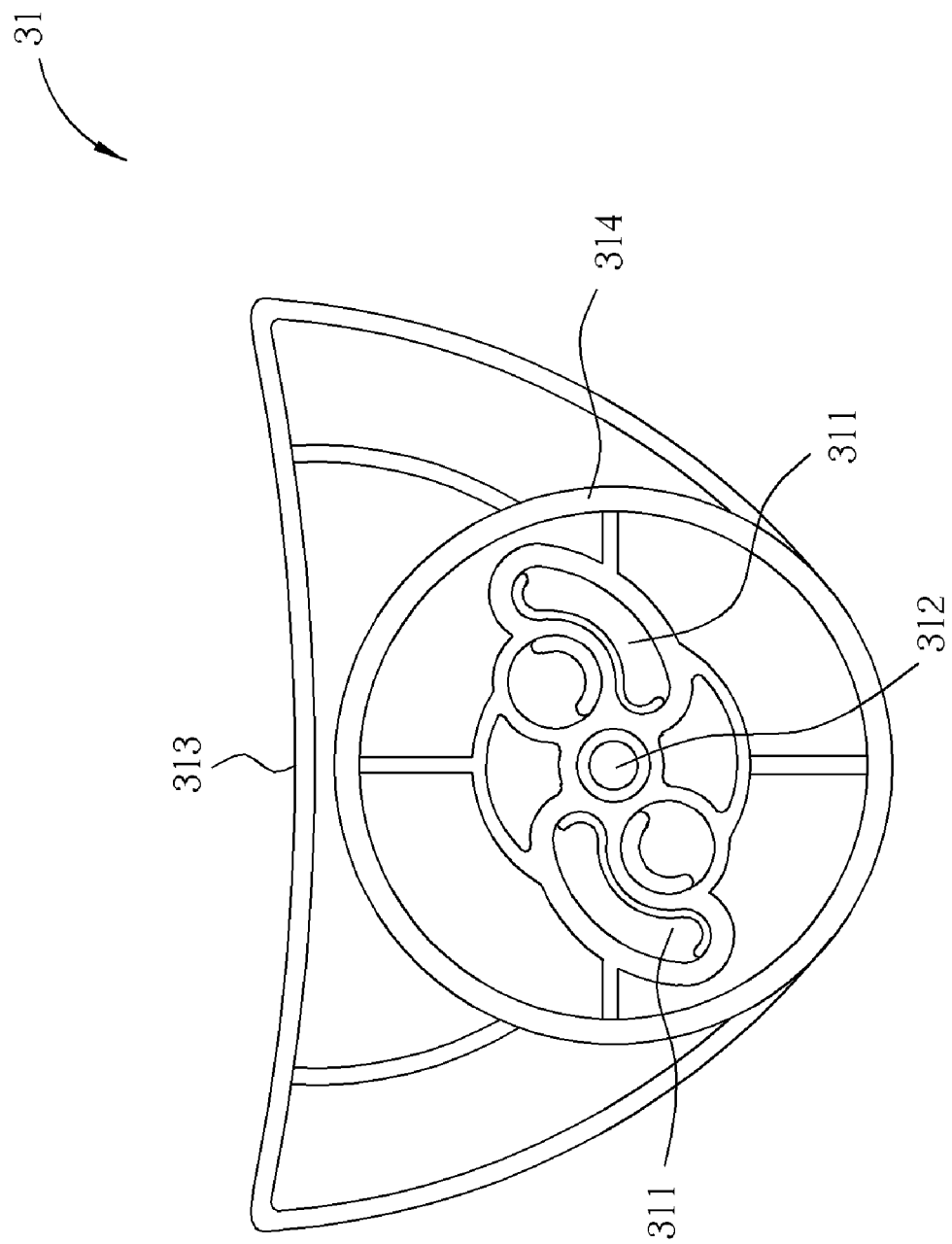
FIG. 2 is an illustration of the actuator of the first exemplary embodiment in FIG. 1.

Please also refer to FIG. 2, which is an illustration of the actuator 31 in the first exemplary embodiment. The actuator 31 comprises two arc grooves 311, a pedal 313, and an axis 312, which the actuator 31 is capable of rotating about the axis 312 in a small degree. The arc grooves 311 are located at the opposite sides of the axis 312 and have arc shape with narrow middle-section and wide edge-sections. The short arms 352 of the two brakes 35 extend out of the first channel 341 of the frame 34, each passes through the horizontal second channel 321 of the retainer 32, and finally are kept in and capable of moving inside the arc grooves 311 of the actuator 31 respectively. The narrow shape of the middle-section of the arc grooves 311 makes the short arms 352 apt to move to the wide end-sections of the art grooves 311 when the short arms 352 are sliding inside and along the arc grooves 311. In such way, the braking system 300 can easily maintain in one of the locking or unlocking statuses when a user is switching the braking system 300 between the locking status and the unlocking status, and the short arms 352 sliding in the arc grooves 311 will generate a click sound to inform the user that the braking system 300 is in locking or unlocking position.

Figure 3:
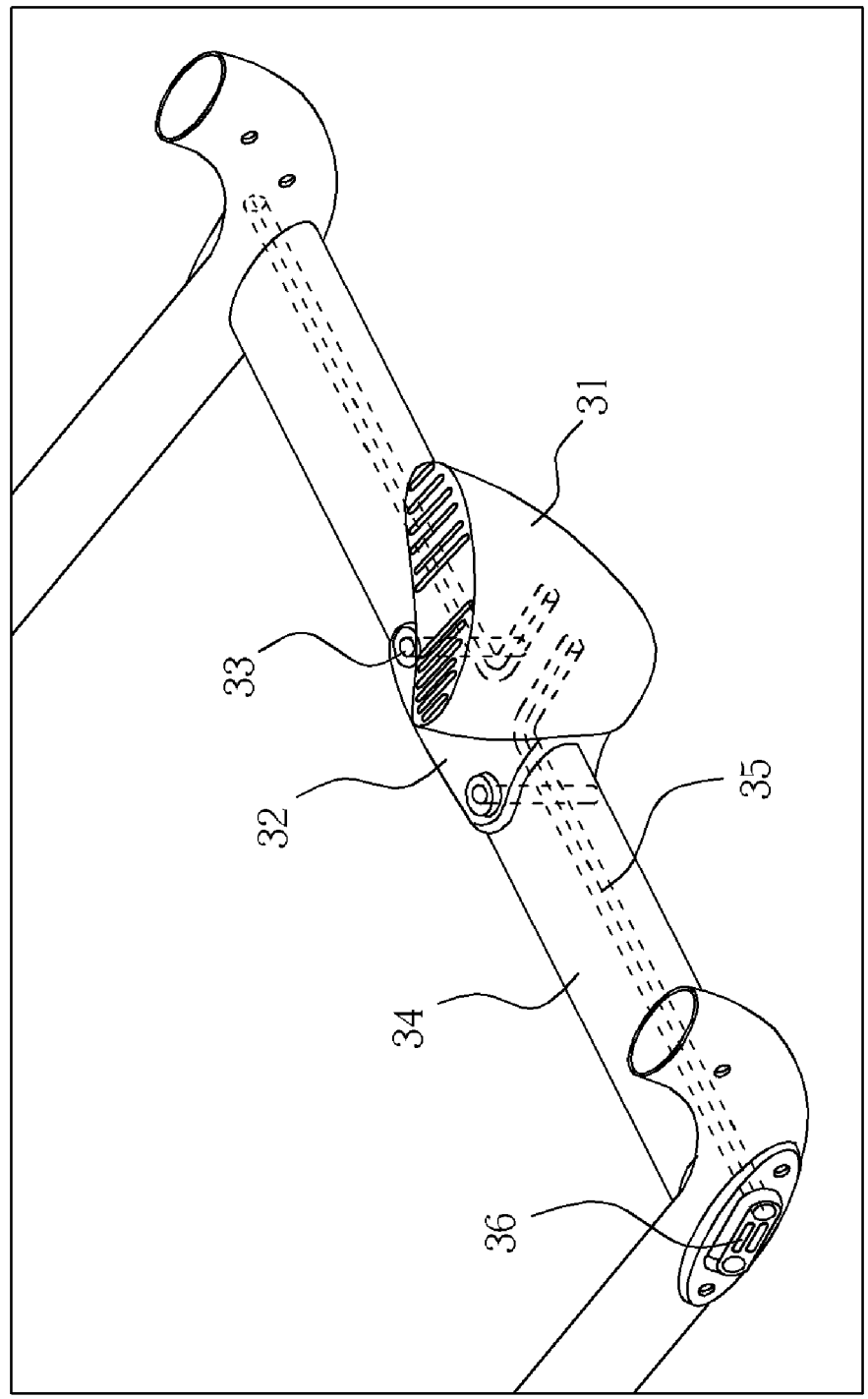
FIG. 3 is an assembled illustration of each components of the braking system.
Figure 4:
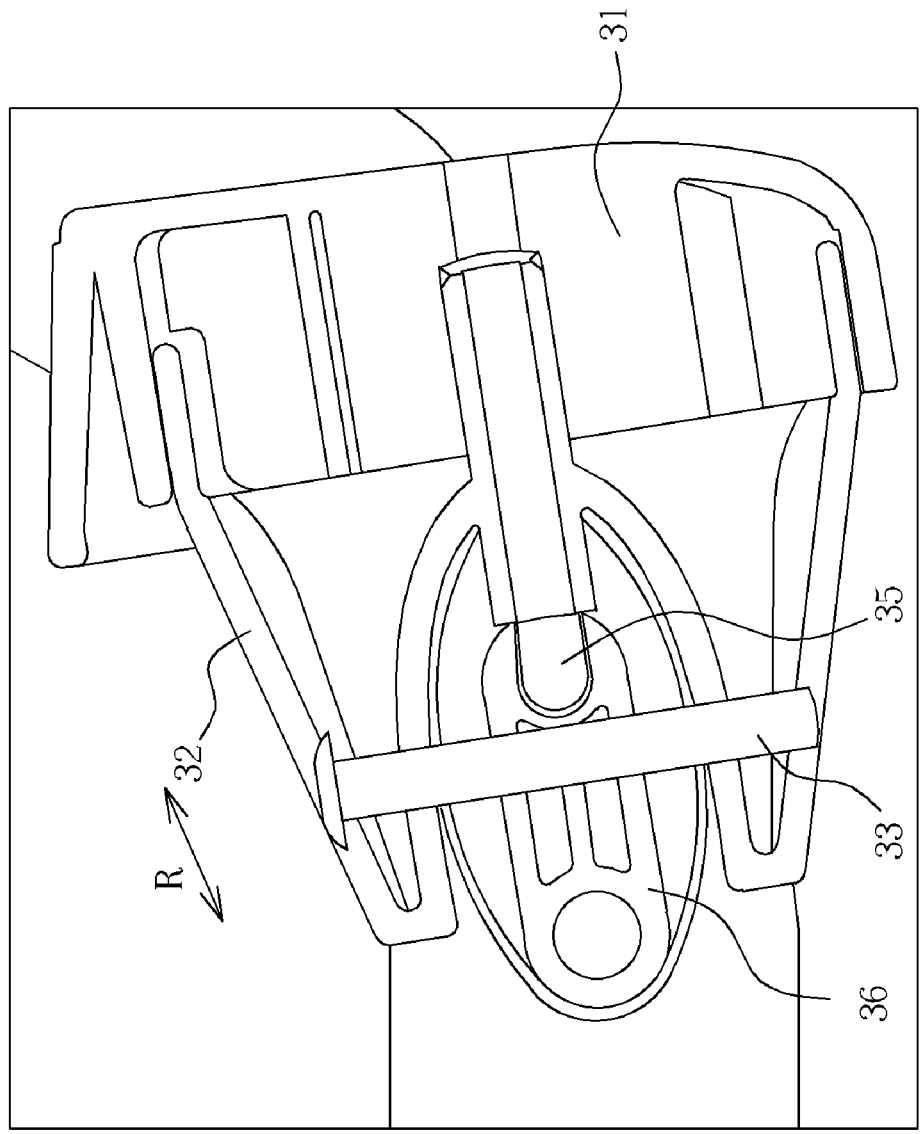
FIG. 4 is an illustration of a section view of the braking system in FIG. 3.

Please refer to FIG. 3 for an assembled illustration of each component of the braking system 300. The retainer 32 is mounted at the frame 34 with the two short arms 352 passing through the second channels 321 and the rivets 33 passing through two first fixing holes 322 of the retainer 32 and two second fixing holes 342 of the frame 34 respectively. Please refer to FIG. 4 for an illustration of the braking system's section view. The rivets 33 that pass through the frame 34 also serve to restrain the brakes 35 in the direction R and therefore, the long arms 351 of the brakes 35 are only allowed to move in the direction along the frame 34 (and also restrained by the frame 34 and the two sleeves 36) instead of the direction R, which is restrained by the rivets 33 and the retainer 34. The actuator 31 is installed on the retainer 32 through plugging a protrusion 323 of the retainer 32 into the axis 312, together with a first column 324 engaging with a second column 314, and screwing a bolt or a nail into the protrusion 323 and the axis 312 (the ends of the two short arms 352 are located in the two arc grooves 311 respectively).

Figure 5:
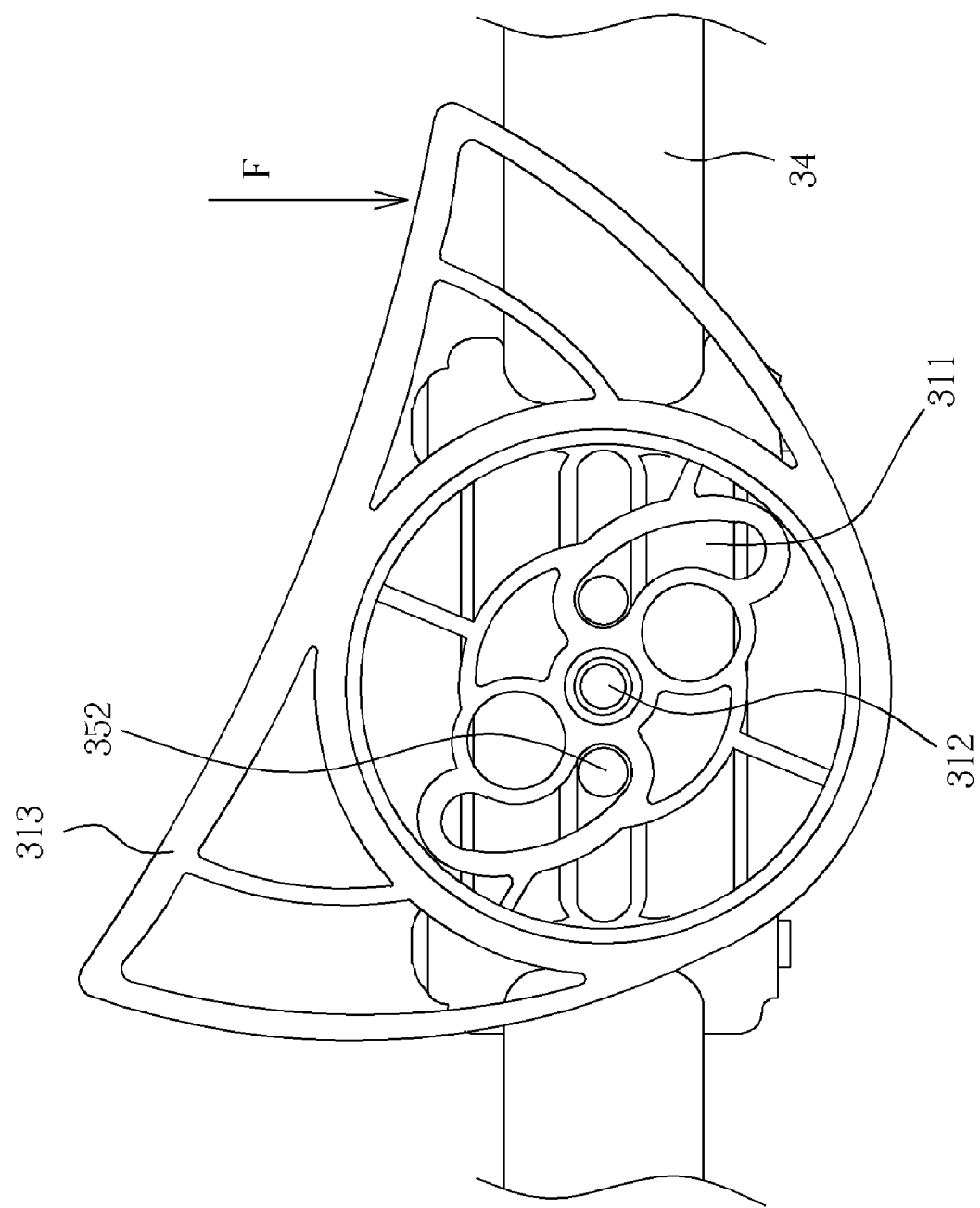
FIG. 5 and FIG. 6 are illustrations of the braking system in an unlocking status.
Figure 6:
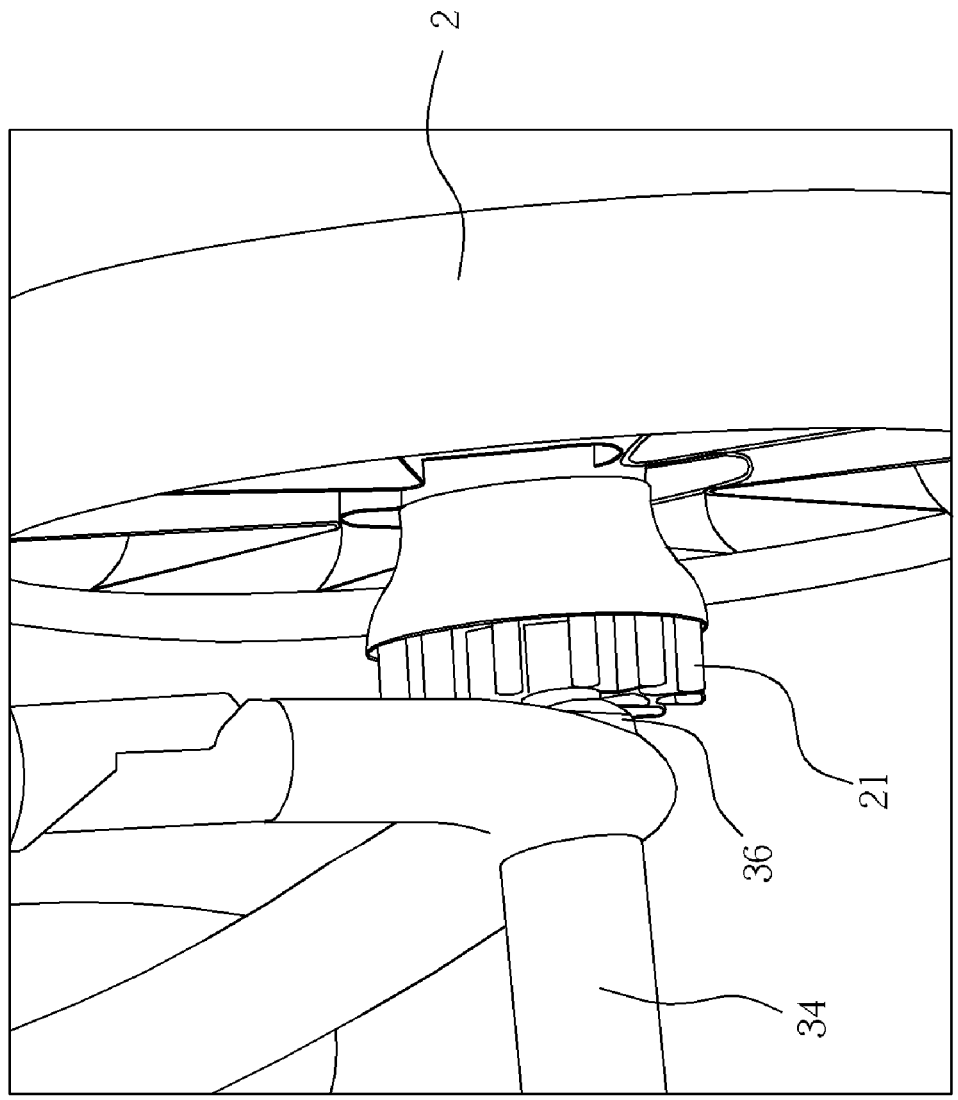
Figure 7:
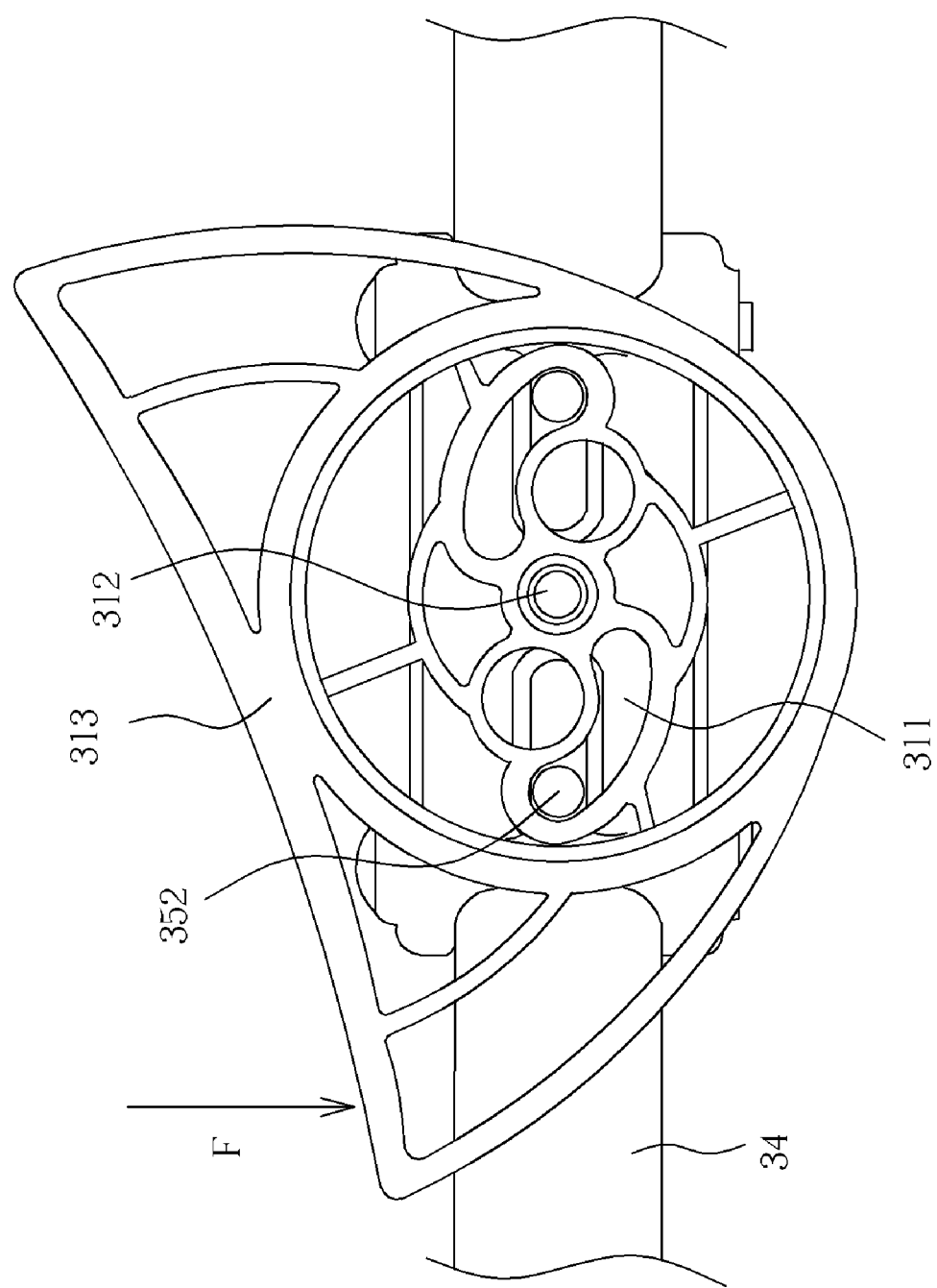
FIG. 7 and FIG. 8 are illustrations of the braking system in a locking status.
Figure 8:
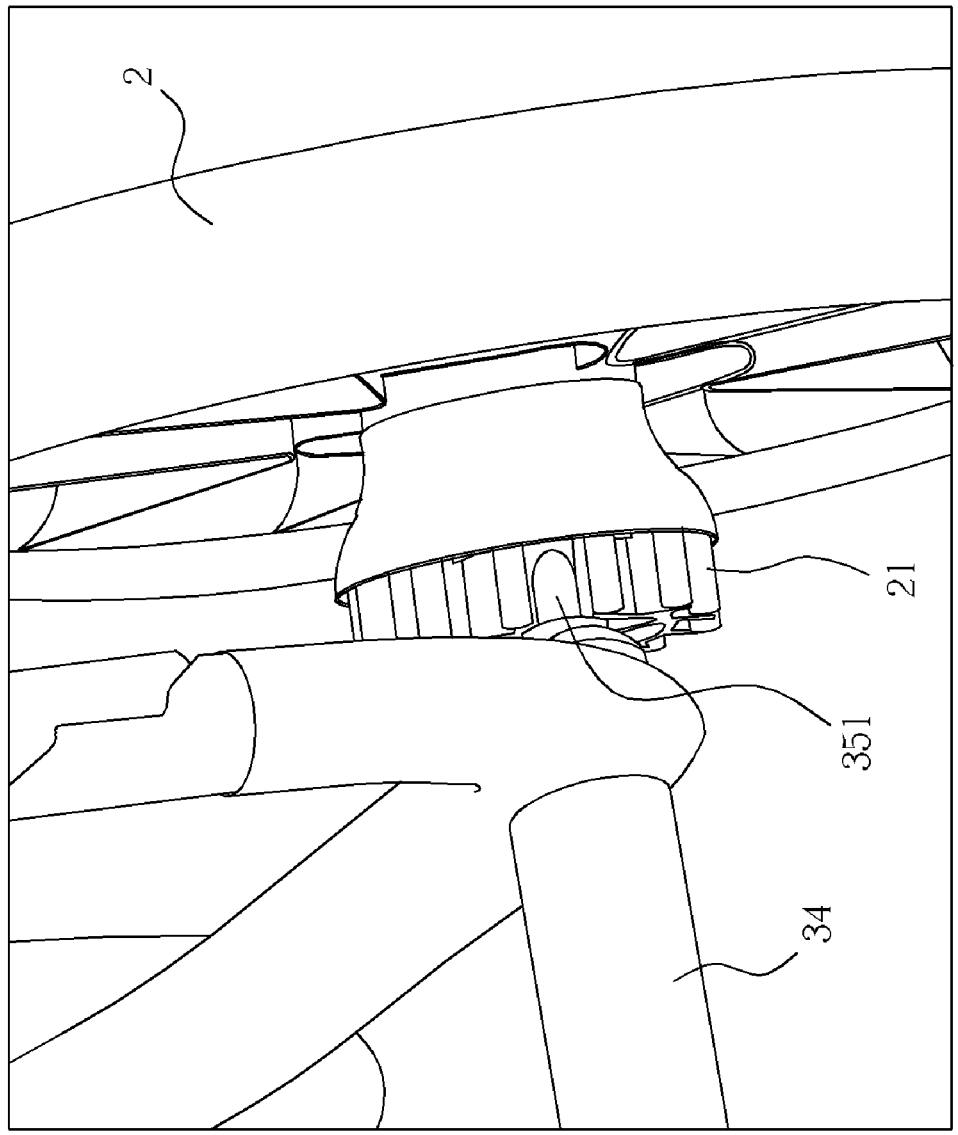

Please refer to FIG. 5 to FIG. 8, wherein FIG. 5 and FIG. 6 are illustrations of the braking system 300 in an unlocking status and FIG. 7 and FIG. 8 are illustrations of the braking system 300 in a locking status. As FIG. 5 shows, when the right side of the pedal 313 of the actuator 31 is exerted with a force in the direction F, the actuator 31 rotates clockwise about the axis 312, and because the two short arms 352 are respectively located in the arc grooves 311, the two short arms 352 of the brakes 35 are brought to move toward the axis 312 and the long arms 351 of the brakes 35 disengage with one of the plurality of teeth of the wheels 2 at the same time, which is shown in FIG. 6, and the braking system 300 is unlocked. As FIG. 7 shows, when the left side of the pedal 313 of the actuator 31 is exerted with a force in the direction F, the actuator 31 rotates counter-clockwise about the axis 312. The two short arms 352 with the influence by the arc grooves 311 are brought to move away from the axis 312 and the long arms 351 of the brakes 35 engage with one of the plurality of teeth of the wheels 2 at the same time, which is shown in FIG. 8, and the braking system 300 is locked.

Figure 9:
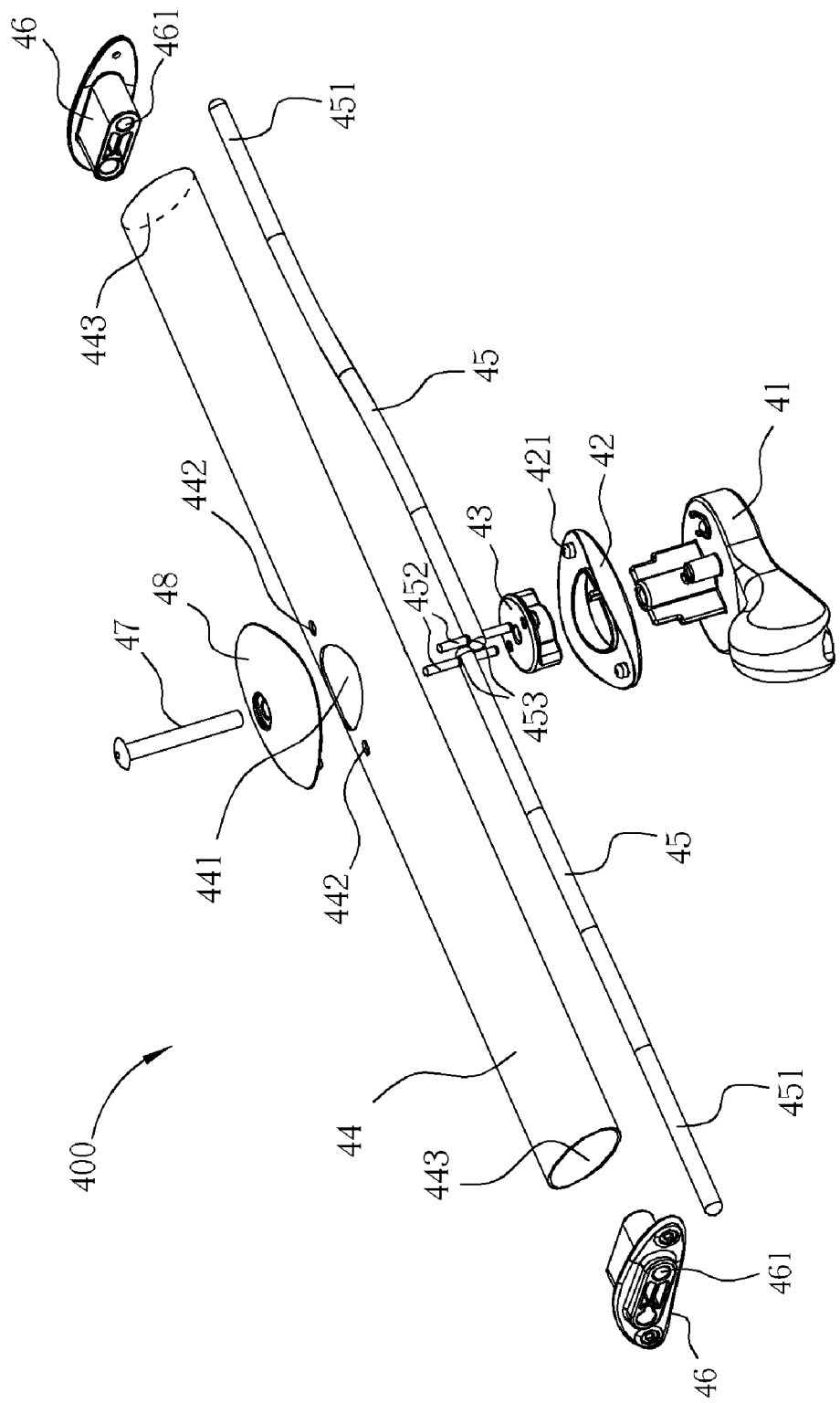
FIG. 9 is an illustration of a second exemplary embodiment of the braking system according to the present invention.
Figure 10:
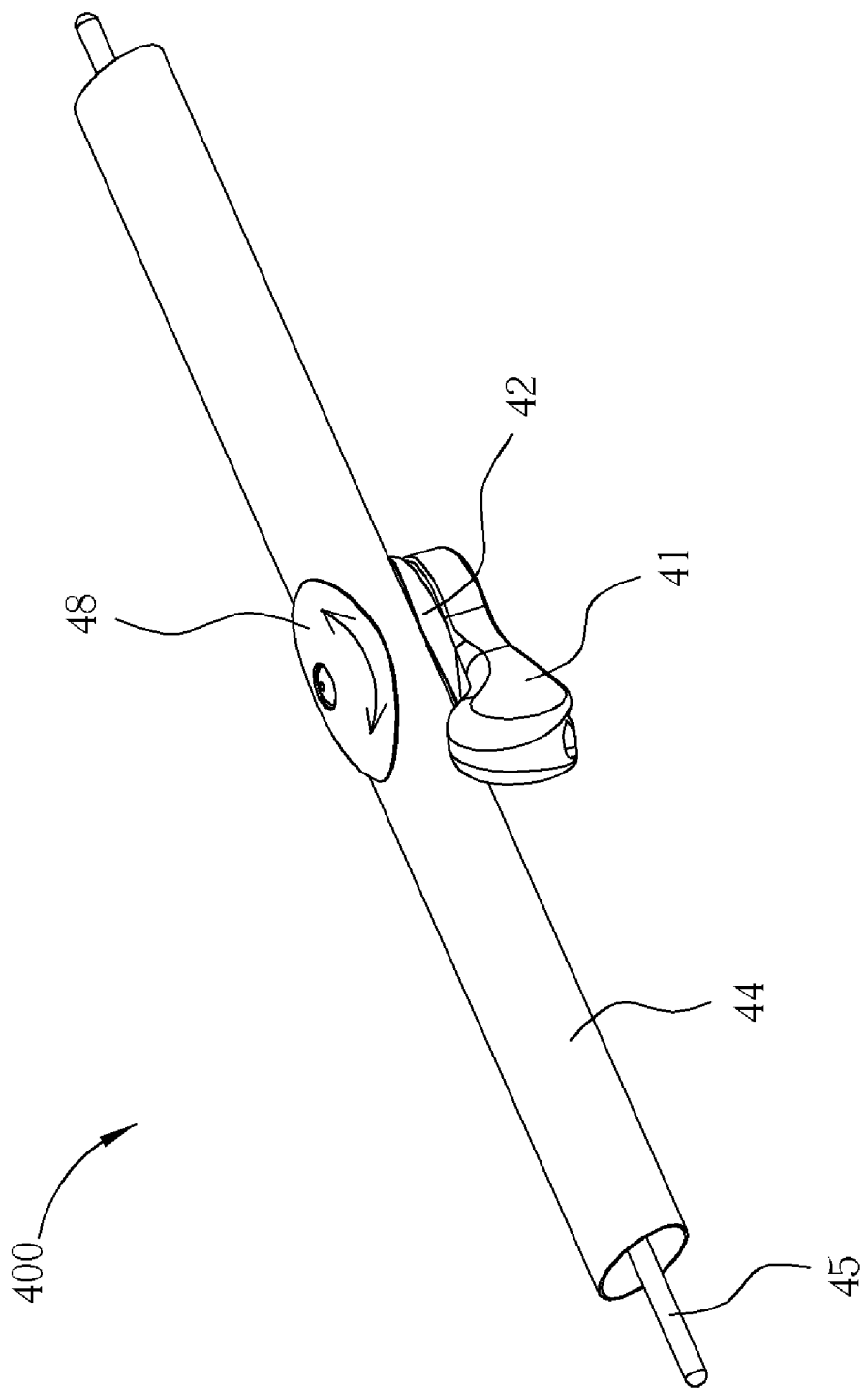
FIG. 10 is an assembled illustration of the second exemplary embodiment of the braking system.

Please refer to FIG. 9 for a second exemplary embodiment according to the present invention that discloses a braking system 400 with single actuation for a stroller. FIG. 10 is an assembled illustration of the second exemplary embodiment of the braking system 400. The braking system 400 comprises an actuator 41, a retainer 42, a rotator 43, a frame 44, two brakes 45, two sleeves 46, a rivet 47, and a cover 48. Each of the two brakes 45 comprises a long arm 451 and a short arm 452 where the long arm 451 has an aperture 453 for the short arm 452 to pass through to engage with the long arm 451. The frame 44 is a hollow pipe and has a first channel 441 in the middle section and two side openings 443 at the sides respectively. Generally the frame 44 can incorporate into and as part of the stroller frame and has two sleeves 46 at its two sides to retain the two brakes 45 and a wheel wire that connects to the two wheels. The two brakes 45 are configured inside the frame 44 with one part of the long arms 451 contained inside the frame 44 and the other part extending out of the frame 44 by passing through the side openings 443 respectively. Each of the two sleeves 46 covering on the side openings 443 has a position hole 461 to restrict the long arm 451 of the brake 45 when passing through the side opening 443 and the position hole 461 to move in one direction.

Figure 11:
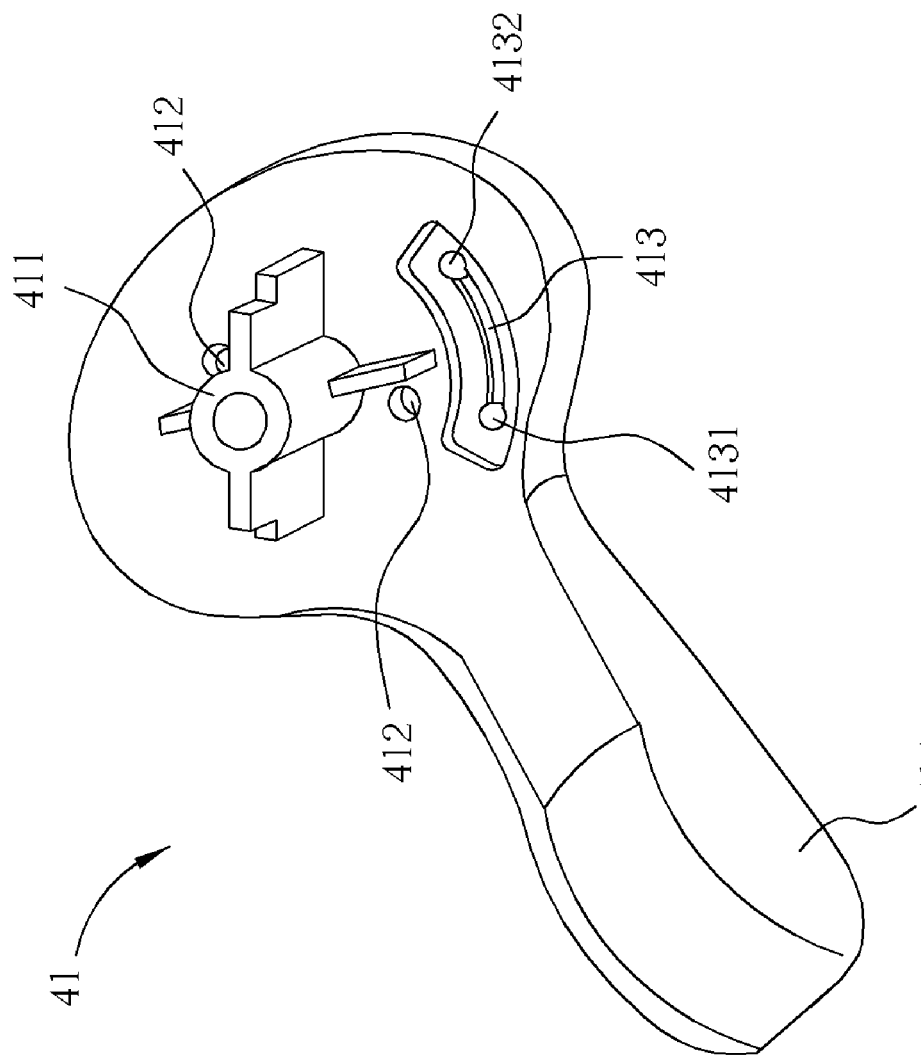
FIG. 11 is an illustration of the actuator in the second exemplary embodiment.
Figure 12:
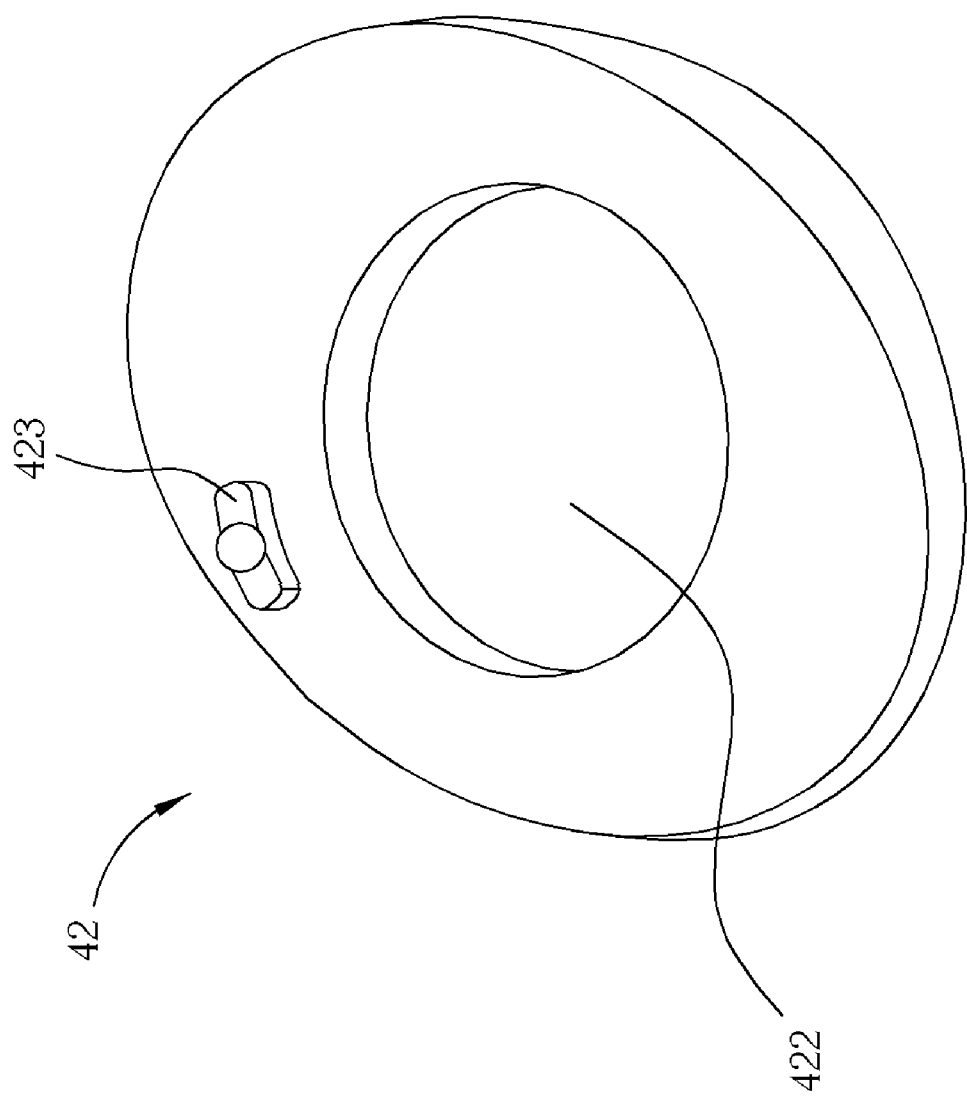
FIG. 12 is an illustration of the retainer in the second exemplary embodiment.
Figure 13:
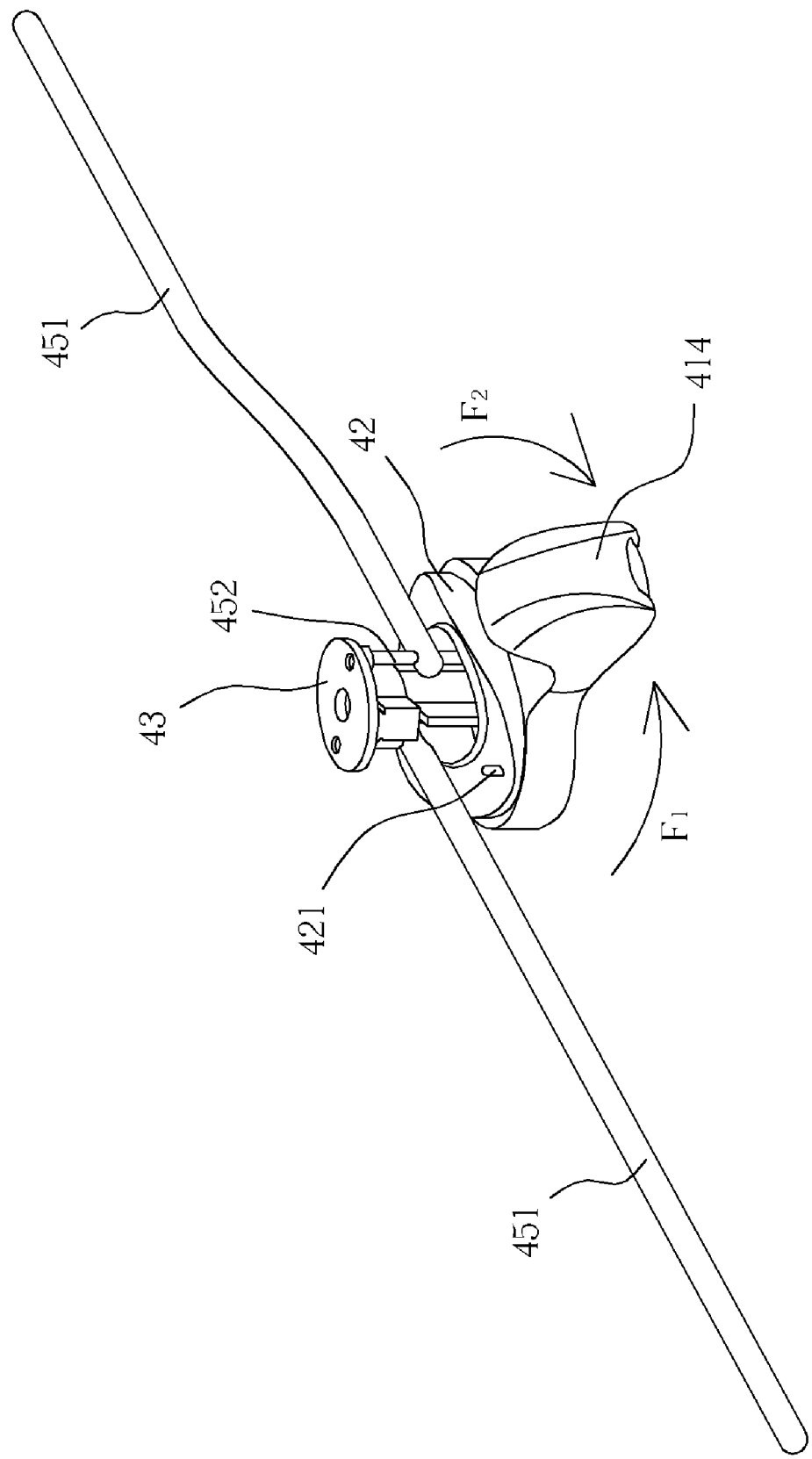
FIG. 13 is an illustration of the combination of the actuator, the retainer, the rotator, and the brakes in the second exemplary embodiment.

Please refer to FIG. 11 to FIG. 13. FIG. 11 is an illustration of the actuator 41 in the second exemplary embodiment, FIG. 12 is an illustration of the retainer 42 in the second exemplary embodiment, and FIG. 13 is an illustration of the combination of the actuator 41, the retainer 42, the rotator 43, and the brakes 45 in the second exemplary embodiment. The actuator 41 comprises a stand 411, two first holes 412, a ditch 413, and a handle 414 and is capable of rotating in a small degree with respect to the stand 411 as an axis. As FIG. 9 shows, the retainer 42 comprises two first protrusions 421, each engaging with a fixing hole 442 (not shown in the figure) at one side of the frame 44, and the retainer 42 can be fixed at the side of the frame 44. The stand 411 of the actuator 41 passes through the central opening 422 of the retainer 42 and the first channel 441, each of the short arms 452 of the brakes 45 passes through the frame 44 from the opposite side of the frame 44 related to the actuator 41 and passes through each of the apertures 453 of the long arms 451 to engage with each of the two first holes 412 of the actuator 41. The other end of each of the short arms 452 can engage with the rotator 43 so that the two short arms 452 can steadily position with each other for a better stability when actuating the brakes 45, as FIG. 13 shows.

Please refer to FIG. 9, FIG. 10, and FIG. 13. The components assembled in FIG. 13 are further assembled with the frame 44 and there are two protrusions situated at the side of the cover 48 facing with the frame 44, which are similar as the first protrusions 421 and not shown in the figures, and engage with the fixing holes 442 at the other side of the frame 44. Then fixing the cover 48, the rotator 43, the retainer 42, and the actuator 41 to the frame 44 by a rivet 47 and FIG. 10 illustrates the final combination of all components.

Please refer to FIG. 13 and FIG. 11. When a force is exerted on the handle 414 in the direction F1, the handle 414 rotates until a second protrusion 423 of the retainer 42 locates in the first end 4131 of the ditch 413 of the actuator 41. Meanwhile, the short arms 452 are brought to rotate relative to the stand 411 and two long arms 451 extend outward to engage with the teeth of the wheels respectively and the braking system 400 is in a locking status. When a force is exerted on the handle 414 in the direction F2, the handle 414 rotates until a second protrusion 423 of the retainer 42 locates in the second end 4132 of the ditch 413 of the actuator 41. Meanwhile, the short arms 452 are brought to rotate relative to the stand 411 and two long arms 451 retract backward and disengage with the teeth of the wheels respectively and the braking system 400 is in an unlocking status.

Figure 14:
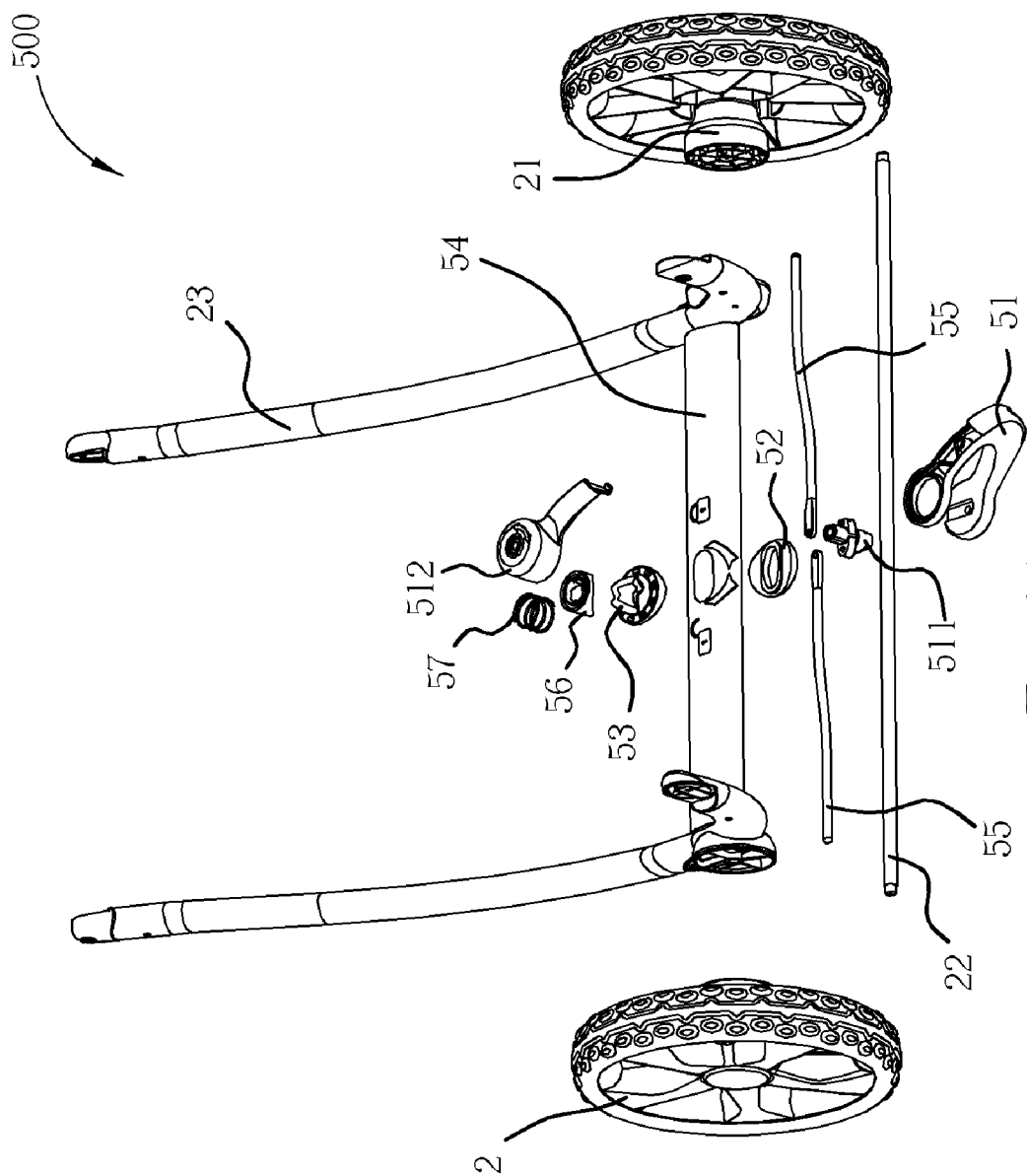
FIG. 14 is an illustration of a third exemplary embodiment of the braking system according to the present invention.
Figure 15:
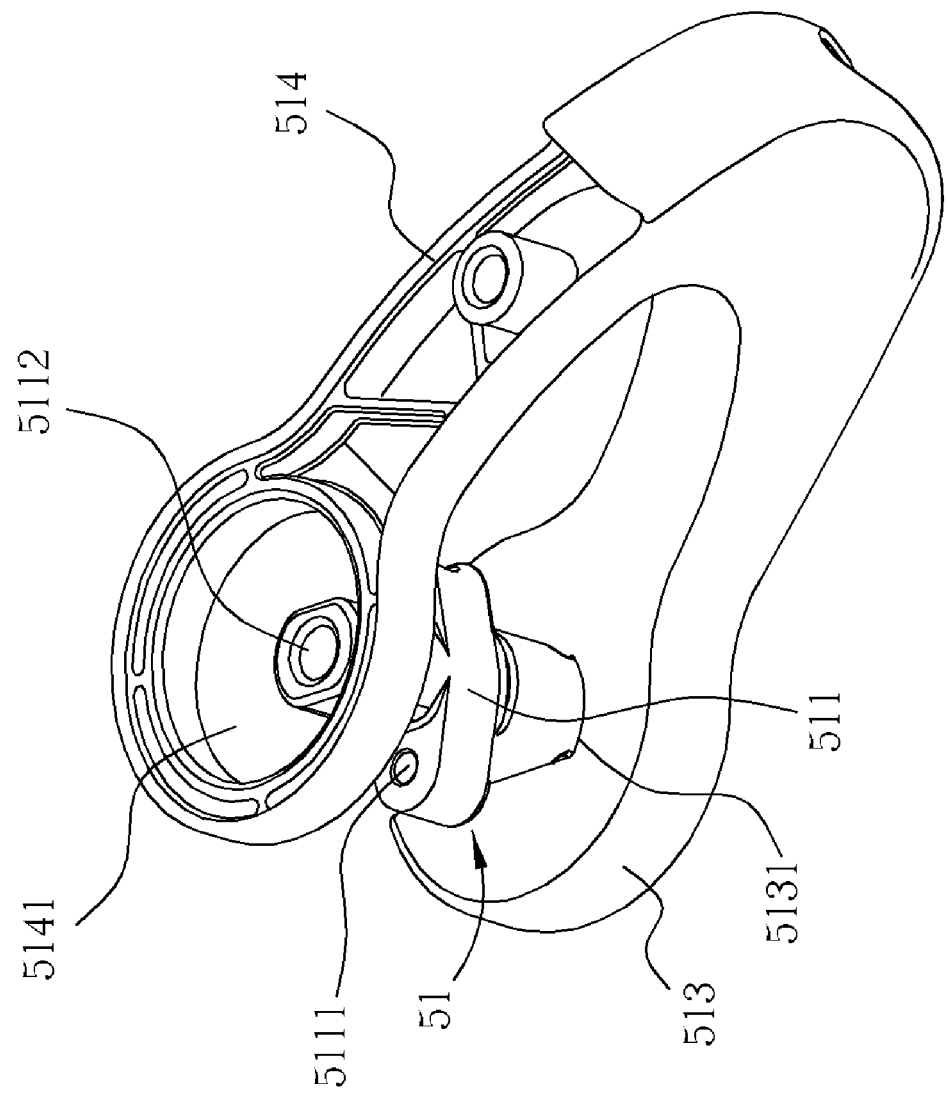
FIG. 15 is an illustration of the actuator in the third exemplary embodiment.
Figure 16:
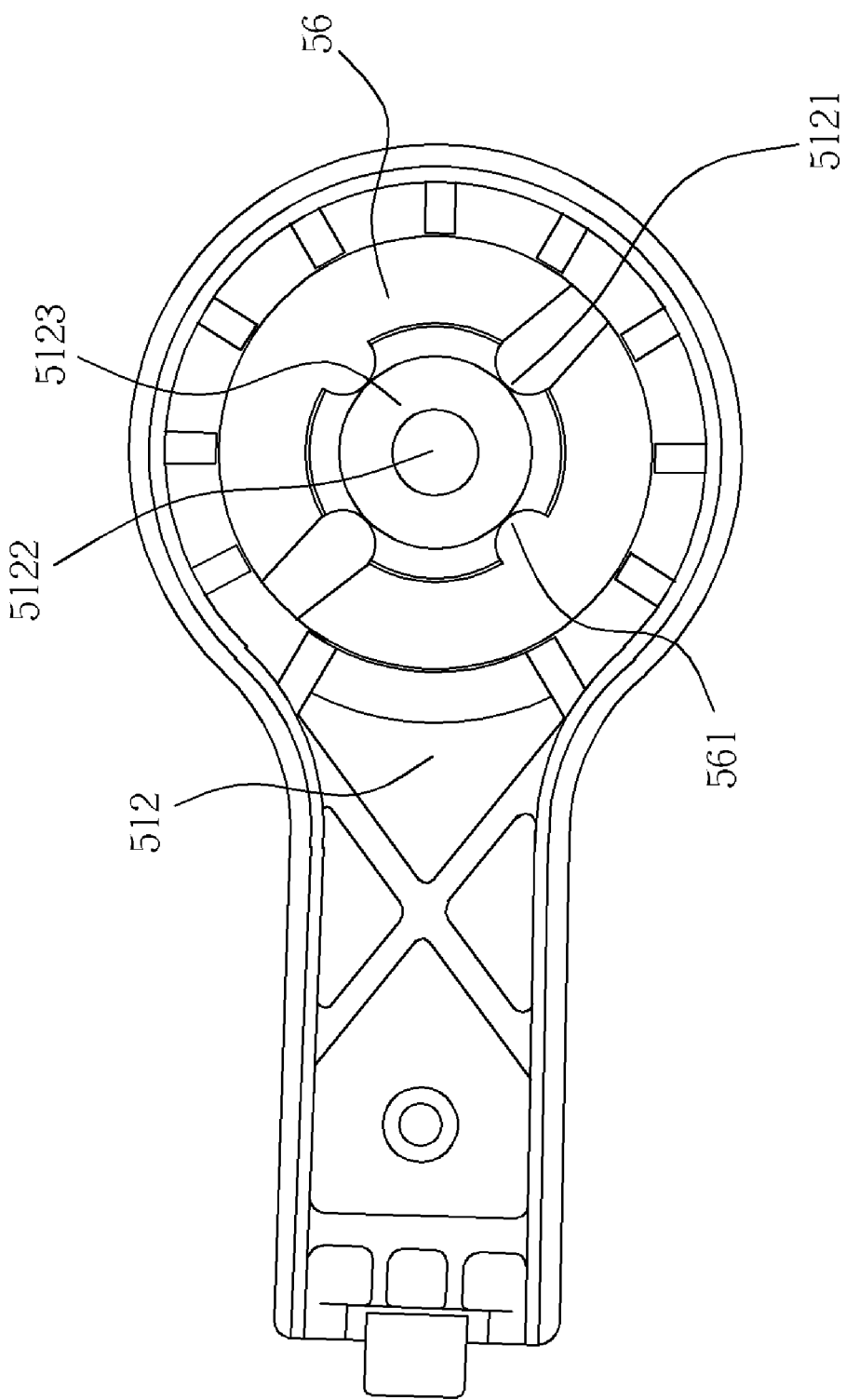
FIG. 16 is an illustration of a section view of the actuator combined with the gear in the third exemplary embodiment.
Figure 17:
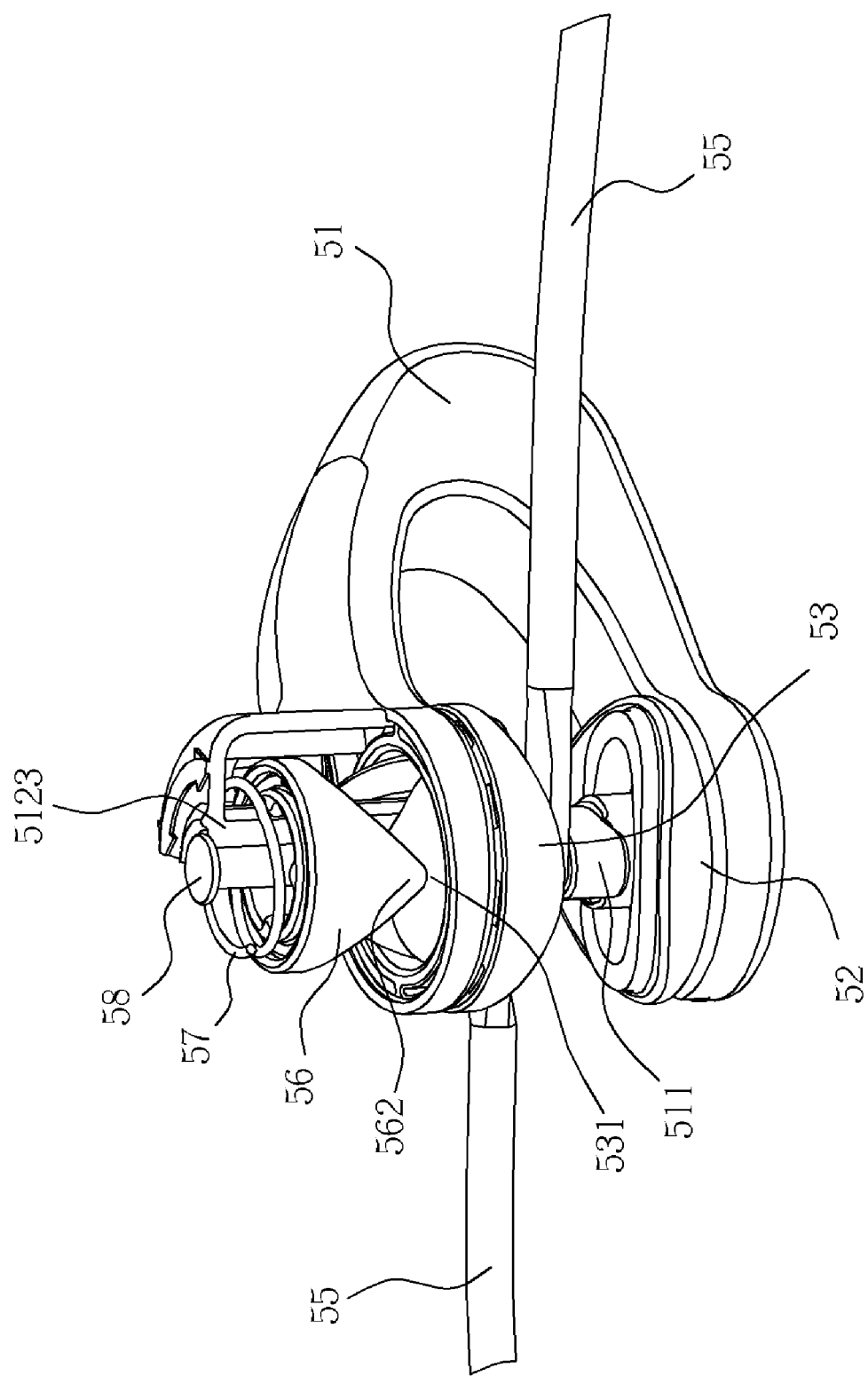
FIG. 17 and FIG. 18 are illustrations of the braking system in the third exemplary embodiment in an unlocking status.

Please refer to FIG. 14 for a third exemplary embodiment according to the present invention. To make the braking system 500 automatically locked, the third exemplary embodiment utilizes a spring incorporating a gear to endow the braking system 500 with automatic locking feature. The braking system 500 comprises an actuator 51, a retainer 52, a cover 53, a frame 54, two brakes 55, a gear 56, a spring 57, and a rivet 58 (shown in FIG. 17), and the brakes 55 engage with the teeth 21 of the wheels 2 for locking the wheels 2 and disengage from the teeth 21 of the wheels 2 for unlocking the wheels 2. The two wheels 2 of the stroller are rotatably connected to the sides of the frame 54 and the rear frames 23 individually, and the wheels 2 connected with each other via a wheel wire 22. FIG. 15 is an illustration of the actuator 51. The actuator 51 comprises a shaft 511, and an operator comprised by an upper seat 514 and a lower seat 513. The shaft 511 is fixed in the trench 5131 and mounted by the retainer 52 for preventing the shaft 511 from coming off the trench 5131. In FIG. 15, the shaft 511 has two holes 5111 for the two brakes 55 of the braking system 500 to be installed therein respectively. As FIG. 14, FIG. 16 and FIG. 17 show, the actuator 51 further comprises an operator cover 512, wherein the operator cover 512 can be part of the upper seat 514 in some cases, installed on the upper seat 514. The gear 56 has a through hole at center and is configured inside the operator cover 512, and there are a plurality of protrusions 561 formed inside the through hole of the gear 56 engaging with a plurality of concaved parts 5121 which are formed on the surface of the axis 5123 of the operator cover 512 contacting with the through hole of the gear, as shown in FIG. 16. When the gear 56 rotates with the operator, the gear 56 moves along the concaved parts 5121 of the axis 5123 of the operator cover 512, wherein the axis 5123 passes through the opening 5141 of the upper seat 514 (in FIG. 15) and the rivet 58 (in FIG. 17) passes through the axial opening 5122, the gear 56, the cover 53, the frame 54, and the axial opening 5112 to assemble the braking system 500.

Figure 18:
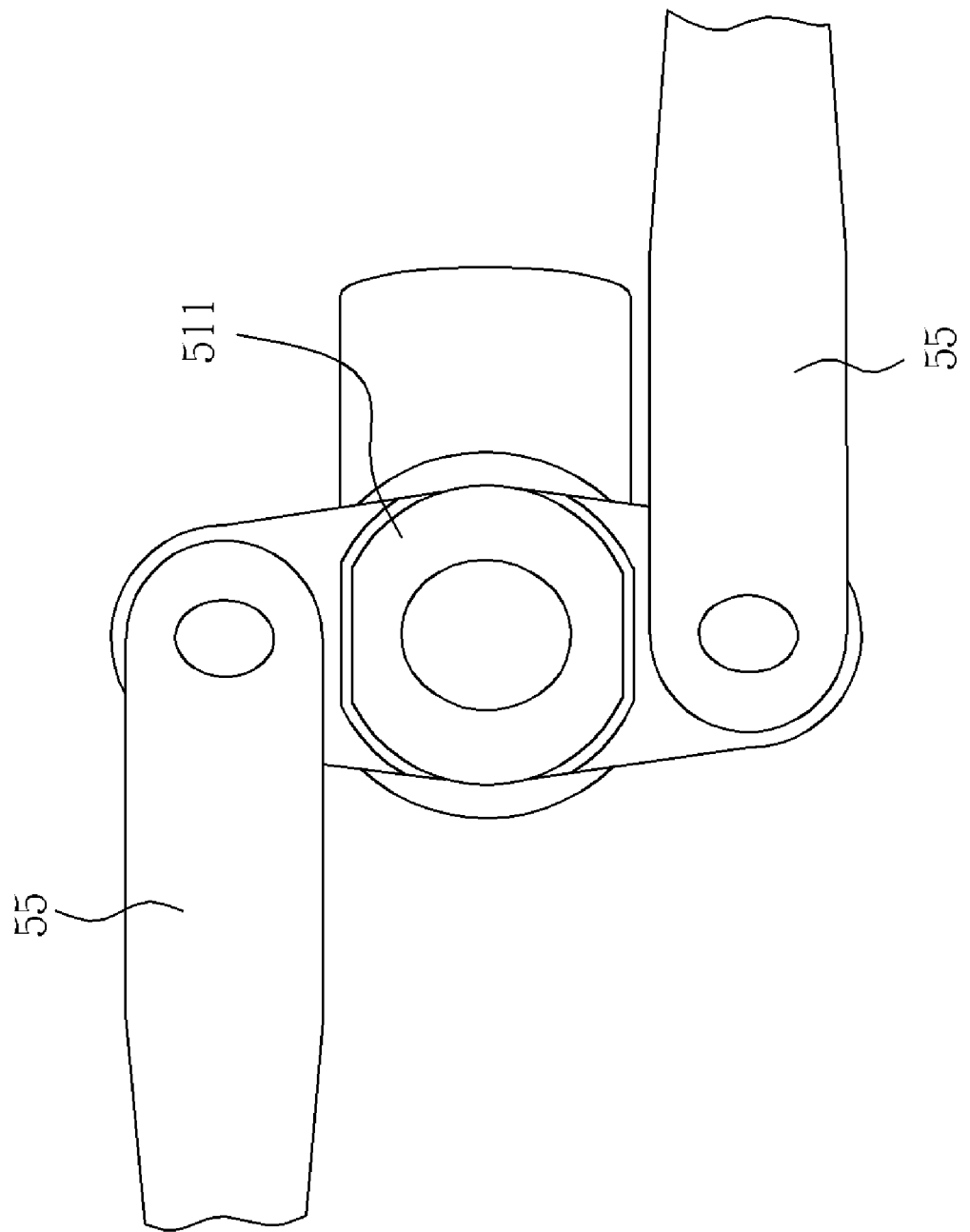
Figure 19:
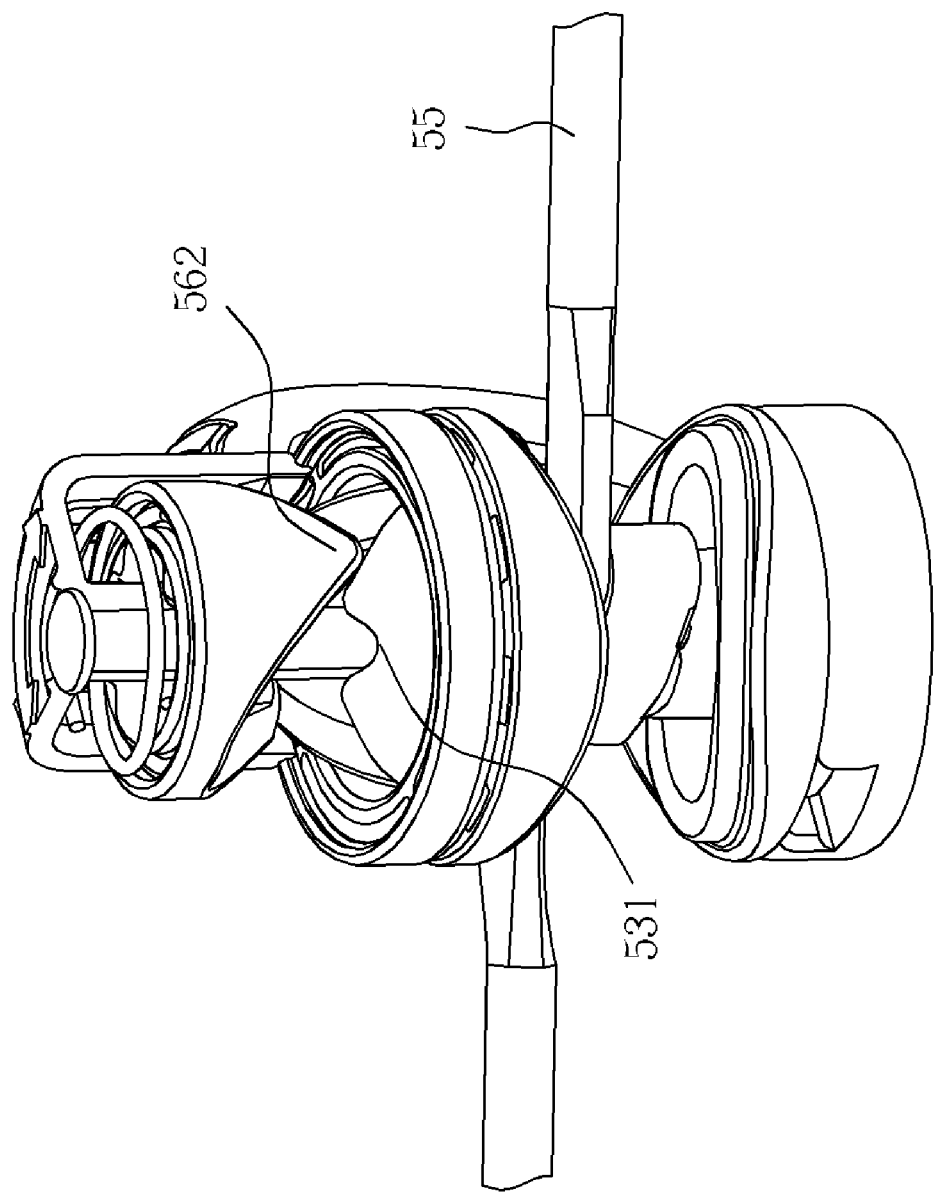
FIG. 19 is an illustration of the braking system with the operator adjusted to a certain position.
Figure 20:
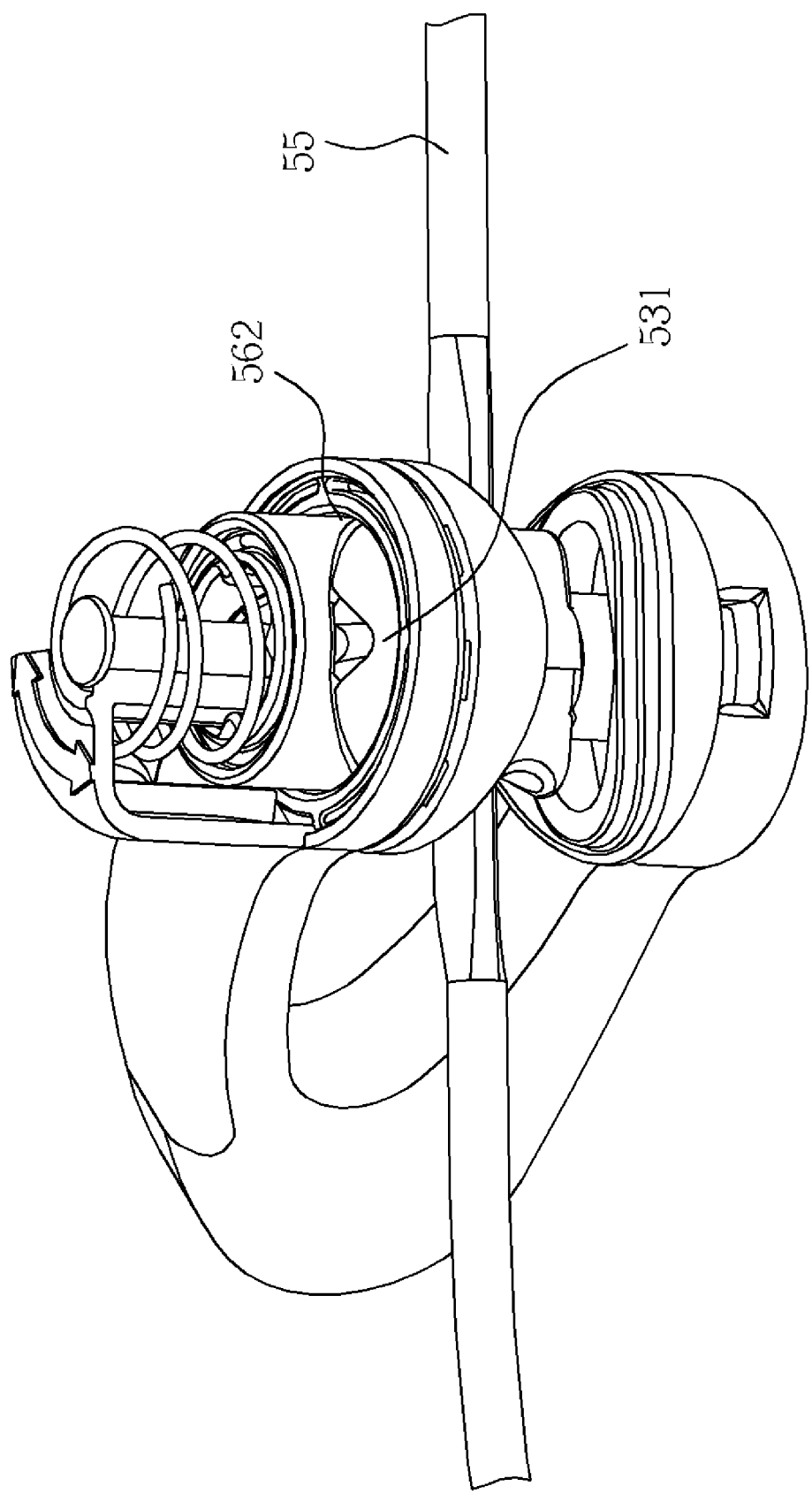
FIG. 20 and FIG. 21 are illustrations of the braking system in the third exemplary embodiment in a locking status.
Figure 21:
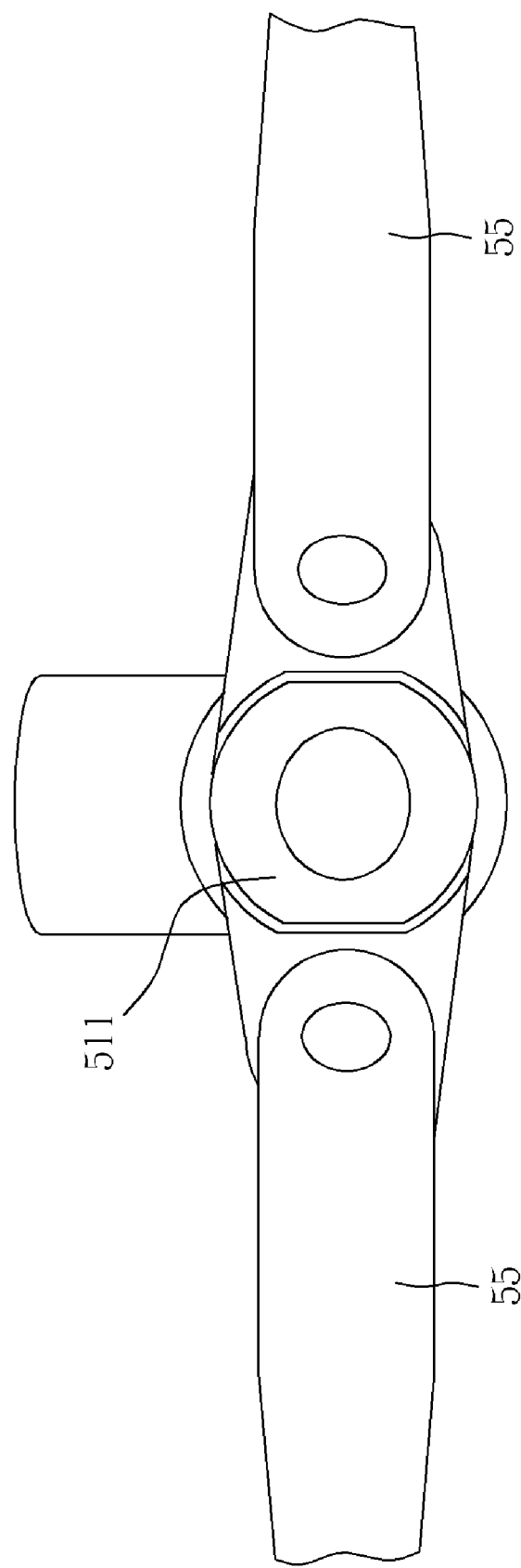

Please refer to FIG. 17 to FIG. 21, wherein FIG. 17 and FIG. 18 are illustrations of the braking system 500 in an unlocking status, and FIG. 20 and FIG. 21 are illustrations of the braking system 500 in a locking status. As the actuator 51 rotates to the status in FIG. 17, the shaft 511 inside the actuator 51 also rotates and drags the two brakes 55 toward the actuator 51, which is also shown in FIG. 18. At this status, the two brakes 55 are brought to disengage from the teeth 21 of the wheels 2 to unlock the wheels 2. As the actuator 51 rotates to the status in FIG. 20, the shaft 511 inside the actuator 51 also rotates and pushes the two brakes 55 outward the actuator 51, which is also shown in FIG. 21. At this status, the two brakes 55 are brought to engage with the teeth 21 of the wheels 2 to lock the wheels 2. The operation in the third exemplary embodiment is similar with that in the first or the second exemplary embodiment and the detailed description is omitted for brevity.

Please refer to FIG. 17, FIG. 20 together with FIG. 19. The cover 53 fixed at the frame 54 has a plurality of indentations 531 for engaging with the plurality of teeth 562 of the gear 56 when the braking system 500 is either in the unlocking status (FIG. 17) or in the locking status (FIG. 20) and accordingly the actuator 51 is retained in either the unlocking status or the locking status. When switching the braking system 500 from the locking status to the unlocking status, or vice versa, a force is exerted on the actuator 51 to rotate and the teeth 562 of the gear 56 are pushed to move upward along the indentations 5121, as shown in FIG. 19. In the status in FIG. 19, the spring 57 connecting between the gear 56 and the operator cover 512 is compressed by the gear 56 and then follows a restoring force generated in the spring 57, which means in the status in FIG. 19 when the actuator 51 is brought to rotate to a certain degree, the restoring force of the spring 57 will push the gear 56 downward and therefore the actuator 51 keeps rotating all the way until it move to the first position or the second position or makes the actuator 51 stay at the end position steadily, i.e., the position of the locking status or the position of the unlocking status of the braking system 500. The more advantage of this embodiment is the way to switch the braking system 500 either from the locking status to the unlocking status, or vice versa, becomes easy by the help of the restoring force of the spring 57.

The braking system for a stroller in the present invention utilizes an actuator to move two brakes close to an axis to unlock the wheels of the stroller and away from the axis to lock the wheels. Each brake comprises a long arm. The brakes are disposed at the opposite sides of the axis. When the actuator is driven to rotate about the axis, the brakes move around the axis to have axial movement close to or away from the axis. With one single actuator to simultaneously move two brakes to lock or unlock the wheels of the stroller, the present invention provides a simple mechanism in the braking system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A braking system for a stroller having a frame and a pair of wheels respectively rotatably connected to the frame, each wheel having a plurality of braking teeth, the braking system comprising:
   a pair of braking members;
   an actuator pivotally connected to the frame and capable of rotating about an axis, the pair of braking members mounted on the actuator at the opposite sides of the axis and capable of engaging with the braking teeth of the wheels or disengaging from the braking teeth of the wheels when the actuator rotates about the axis;
   a cover fixed on the frame; and
   a gear moveably mounted on the actuator, utilized for being pushed by the cover so as to move along the axis relative to the cover when the actuator rotates about the axis.

2. The braking system of claim 1 wherein the actuator comprises:
   an operator having a lower seat pivotally connected to the frame; and
   a shaft fixed on the lower seat, the axis locating at the shaft, the pair of braking members mounted on the shaft at the opposite sides of the axis.

3. The braking system of claim 1 wherein the cover comprises a plurality of indentations, and the gear comprises a plurality of teeth for selectively engaging with one of the indentations of the cover.

4. The braking system of claim 3, further comprising a spring connecting between the actuator and the gear for biasing the plurality of teeth of the gear to engage with the plurality of indentations.

5. The braking system of claim 1 wherein each of the pair of braking members further comprises a long arm for engaging with the braking teeth of the wheels, and a short arm connected to the long arm, the short arm is connected to the actuator at the opposite sides of the axis.

6. The braking system of claim 5 wherein each of the long arms of the pair of braking members has an aperture for the short arm to pass through and mount on the actuator.

7. The braking system of claim 5 wherein the actuator further comprises two arc grooves located at the opposite sides of the axis, each of the short arms of the pair of braking members is kept within one of the arc grooves and capable of moving along the arc groove when the actuator rotates about the axis.

8. The braking system of claim 5 wherein the frame of the stroller is configured between the pair of wheels and the pair of braking members are configured inside the frame, the frame has two side openings for keeping the long arms of the pair of braking members moving in one direction and a first channel located between the two side openings, each of the long arms of the pair of braking members passes through the side openings of the frame, and the short arms of the pair of braking members pass through the first channel of the frame.

9. The braking system of claim 8, further comprising two sleeves mounted on the two side openings of the frame respectively, the long arms of the pair of braking members passing through the sleeves and engaging with the braking teeth of the wheels.

10. The braking system of claim 5, further comprising:
   a retaining device configured at the frame and having a protrusion and two second channels, the protrusion passing through the axis of the actuator and the short arms of the pair of braking members passing through the two second channels respectively; and
   two rivets, each passing through the retaining device and the frame for fixing the retaining device at the frame and keeping the long arms of the pair of braking members moving in one direction.

11. The braking system of claim 5 wherein the actuator further comprises a ditch, and the braking system further comprises:
   a retaining device secured on the frame of the stroller having a protrusion, the protrusion being capable of sliding in the ditch when the actuator rotates about the axis.

12. The braking system of claim 1 wherein the two brakes are L-shaped rods.

13. The braking system of claim 1 wherein the actuator further comprises a pedal for driving the actuator to rotate about the axis.

14. The braking system of claim 1 wherein the actuator further comprises a handle for driving the actuator to rotate about the axis.

15. The braking system of claim 1, further comprising a biasing member connecting to the actuator, when the actuator rotates about the axis, the biasing member keeps the actuator rotating until it moves to a first position where the pair of braking members disengage from the braking teeth of the wheels or a second position where the pair of braking members engage with the braking teeth of the wheels.

16. The braking system of claim 15, wherein the cover comprises a plurality of indentations and the gear comprises a tooth for selectively engaging with one of the indentations of the cover, and the biasing member comprises a spring connecting between the actuator and the gear for keeping the actuator being rotated by the gear when the actuator rotates about the axis.

* * * * *